US012781093B2

(12) United States Patent
Abe et al.

(10) Patent No.: US 12,781,093 B2
(45) Date of Patent: Nov. 3, 2026

(54) METHOD FOR PRODUCING POLISHING COMPOSITION

(71) Applicant: FUJIMI INCORPORATED, Aichi (JP)

(72) Inventors: Masashi Abe, Aichi (JP); Toshio Shinoda, Aichi (JP); Satoshi Ishiguro, Aichi (JP); Satoru Yarita, Aichi (JP)

(73) Assignee: FUJIMI INCORPORATED, Aichi (JP)

( * ) Notice: Subject to any disclaimer, the term of this patent is extended or adjusted under 35 U.S.C. 154(b) by 482 days.

(21) Appl. No.: 17/729,672

(22) Filed: Apr. 26, 2022

(65) Prior Publication Data

US 2022/0372330 A1 Nov. 24, 2022

(30) Foreign Application Priority Data

May 21, 2021 (JP) ................................ 2021-086075
Mar. 9, 2022 (JP) ................................ 2022-036107

(51) Int. Cl.
*C01B 33/141* (2006.01)
*C09G 1/02* (2006.01)
*C09K 3/14* (2006.01)

(52) U.S. Cl.
CPC ............ *C09G 1/02* (2013.01); *C01B 33/1417* (2013.01)

(58) Field of Classification Search
CPC ....... C01B 33/14; C01B 33/146; C01B 33/18; C09K 3/1463; C09K 3/14; C09K 3/1454; C09K 3/1472; C09K 3/1436; C09K 3/1409; C01P 2004/51; H01L 21/02
See application file for complete search history.

(56) References Cited

U.S. PATENT DOCUMENTS 10,119,048 B1 11/2018 Guo et al.
2015/0376458 A1* 12/2015 Grumbine ................ C09G 1/02 252/79.1
2021/0047541 A1* 2/2021 Tseng ....................... C09G 1/02

FOREIGN PATENT DOCUMENTS

JP 2005162533 A 6/2005
JP 2008179763 A * 8/2008 ............... C09G 1/02
JP 2017-524770 A 8/2017
JP 2019-163420 A 9/2019
JP 2020025005 A 2/2020
KR 20170021322 A 2/2017
TW 1551673 B 10/2016
TW 201945284 A 12/2019
WO 2015200668 A1 12/2015

OTHER PUBLICATIONS

Machine Translation of JP-2008179763-A (Year: 2008).*
Extended European Search Report for EP Patent Application No. 22173494 with a mailing date of Oct. 19, 2022.
Office Action for Taiwan Patent Application No. 1111166492 with a mailing date of Sep. 11, 2025.
Office Action for Taiwan Patent Application No. 111116649 with a mailing date of May 6, 2025.
Office Action for Japanese Patent Application No. 2022-036107, with a mailing date of Nov. 27, 2025.
Office Action for Japanese Patent Application No. 2022-036107, with a mailing date of Feb. 16, 2026.
Office Action for TW Patent Application No. 10202204315S, with a mailing date of Apr. 10, 2026.
Office Action for CN Patent Application No. 202210555942.0, with a mailing date of Apr. 3, 2026.
Office Action for KR Patent Application No. 10-2022-0047412, with a mailing date of Apr. 11, 2026.
Office Action for EP Patent Application No. 22 173 494.0-1102, with a mailing date of Jun. 5, 2026.

* cited by examiner

*Primary Examiner* — Amber R Orlando
*Assistant Examiner* — Sarah Catherine Case
(74) *Attorney, Agent, or Firm* — KATTEN MUCHIN ROSENMAN LLP

(57) ABSTRACT

The method for producing a polishing composition according to the present invention includes mixing a dispersion containing silica and a solution containing a silane coupling agent having a cationic group at a concentration of 0.03% by mass or more and less than 1% by mass to obtain a dispersion containing cationically modified silica.

17 Claims, No Drawings

METHOD FOR PRODUCING POLISHING COMPOSITION

CROSS-REFERENCE TO RELATED APPLICATION

The present application is based on Japanese Patent Application No. 2021-86075 filed on May 21, 2021, and Japanese Patent Application No. 2022-36107 filed on Mar. 9, 2022, and a disclosed content thereof is incorporated herein as a whole by reference.

BACKGROUND

1. Technical Field

The present invention relates to a method for producing a polishing composition.

2. Description of Related Arts

In the semiconductor device manufacturing processes, techniques for manufacturing highly densified and highly integrated wiring have been demanded as the performance of semiconductor devices improves. In such semiconductor device manufacturing processes, CMP (Chemical Mechanical Polishing) is an essential process. As microfabrication of semiconductor circuits proceeds, higher flatness for the unevenness of a patterned wafer is required and realization of higher smoothness in nano order by CMP has also been required. In order to achieve high smoothness by CMP, it is preferable to polish the convex portions of the patterned wafer at a high polishing rate, but not to polish the concave portions too much.

Here, in CMP, a composition (polishing composition) that contains various additives such as polishing accelerators, pH adjusting agents, etc., in addition to a polishing agent (an abrasive) called abrasive grains, is generally used. Here, abrasive grains (polishing agent) are particles that have the function of adhering to a surface of an object to be polished and scraping off the surface by physical action. In addition, as the raw material for abrasive grains (polishing agent) used in the production of a polishing composition, a silica dispersion such as colloidal silica having silica (silicon oxide; $SiO_2$) particles as a dispersoid that can be abrasive grains (polishing agent) is typically used.

This silica dispersion is known to be less stable under acidic conditions due to aggregation of silica particles, and a silica dispersion excellent in stability over a wide pH range has been conventionally demanded.

As colloidal silica having improved stability, for example, colloidal silica obtained by treating aqueous colloidal silica with an aqueous solution of basic aluminum chloride, or colloidal silica obtained by treating aqueous colloidal silica with an aqueous solution of basic aluminum salts followed by stabilization treatment with a water-soluble organic aliphatic polycarboxylic acid, have been known.

However, although such colloidal silica improved stability thereof, there was a problem of containing a large amount of metallic impurities and unable to be used for applications that required high purity, such as abrasive grains (polishing agent) for polishing semiconductor wafers, for example.

As a technique to reduce a mixed amount of such metallic impurities, Japanese Patent Laid-Open No. 2005-162533 discloses a technique for producing modified colloidal silica by modifying colloidal silica produced by hydrolyzing a hydrolysable silicon compound, using a modifier such as a silane coupling agent. According to Japanese Patent Laid-Open No. 2005-162533, it is deemed that such a method can produce modified colloidal silica that are stably dispersible over a long period of time, contain very low levels of metallic impurities and are of high purity without causing aggregation or gelation of the colloidal silica.

SUMMARY

However, the present inventors investigated the technique described in the aforementioned Japanese Patent Laid-Open No. 2005-162533, and then found that coarse particles might have been generated after the addition of the silane coupling agent. When such coarse particles were generated, there occurs a problem of the productivity of modified colloidal silica being reduced.

Then, an object of the present invention is to provide a means of capable of inhibiting generation of coarse particles after addition of a silane coupling agent having a cationic group in a method for producing a polishing composition, comprising modifying silica by using the silane coupling agent having a cationic group.

To solve the problem described above, the present inventors carried out intensive studies. As a result, it was found that the aforementioned problem can be solved by a method for producing a polishing composition, including mixing a dispersion containing silica and a solution containing a silane coupling agent having a cationic group at a concentration of 0.03% by mass or more and less than 1% by mass to obtain a dispersion containing cationically modified silica. Based on the above findings, the present inventors have completed the present invention.

DETAILED DESCRIPTION

Hereinafter, embodiments of the present invention will be described. The present invention is not limited only to the following embodiments. Moreover, in the present description, operation and measurement of physical properties, etc., are carried out at room temperature (20° C. or more and 25° C. or less)/relative humidity of 40% RH or more and 50% RH or less, unless otherwise noted.

The method for producing a polishing composition according to one embodiment of the present invention (hereinafter referred to simply as "production method according to the present invention" or "production method") includes mixing a dispersion containing silica and a solution containing a silane coupling agent having a cationic group at a concentration of 0.03% by mass or more and less than 1% by mass to obtain a dispersion containing cationically modified silica. According to the production method having such a configuration according to one embodiment of the present invention, the generation of coarse particles after the addition of silane coupling agent having a cationic group can be inhibited. Moreover, according to the production method according to one embodiment of the present invention, it is possible to utilize a cationically modified silica aqueous dispersion with excellent filterability, and to use a fine filter when carrying out filtering a polishing composition, which is advantageous for reducing the number of coarse particles in the polishing composition.

Cationically modified silica as used herein refer to a compound in which a cationic group (for example, an amino group or a quaternary ammonium group) is bonded to a surface of silica (preferably colloidal silica). According to one preferred embodiment of the present invention, the cationically modified silica is amino group modified silica, more preferably amino group modified colloidal silica.

[Dispersion Containing Silica]

In the production method according to one embodiment of the present invention, a dispersion containing silica (hereinafter referred to simply as "silica dispersion") is used as a raw material. The silica contained in the silica dispersion is a raw material before being cationically modified (reformed) with a silane coupling agent having a cationic group as described below.

The silica as a raw material used in the present invention may be natural crystalline silica, natural non-crystalline silica, synthetic crystalline silica, and synthetic non-crystalline silica. However, the silica is preferably non-crystalline silica (amorphous silica), and more preferably synthetic non-crystalline silica (synthetic amorphous silica). It is noted that as the silica, a single type of silica may be used alone, or a combination of two or more types may be used. In addition, the silica used here may be a commercially available product or synthetic product.

The method for producing the non-crystalline silica (the amorphous silica) includes, for example, wet methods such as neutralizing sodium silicate with mineral acid (soda silicate method) and hydrolyzing alkoxysilane (sol-gel method); and dry methods such as vaporizing silicon chloride and synthesizing silica particles by a gas phase reaction in a high temperature hydrogen flame (gas phase method or gas combustion method), and a method (melting method) for heat treating mixed raw materials composed of finely pulverized silica stone, a reducing agent such as metallic silicon powder or carbon powder, and water for making a slurry, at high temperature under a reducing atmosphere to generate a SiO gas, and cooling the SiO gas in an atmosphere containing oxygen, and the method for producing the non-crystalline silica (the amorphous silica) is not limited thereto. However, from the viewpoint of reducing metallic impurities, the non-crystalline silica (the amorphous silica) is preferably colloidal silica, and more preferably the colloidal silica produced by the sol-gel method. The colloidal silica produced by the sol-gel method is preferred because the silica contain less diffusible metallic impurities and corrosive ions such as chloride ions in the semiconductor. The production of the colloidal silica by the sol-gel method can be carried out by using conventionally and publicly known methods. Specifically, by using a hydrolysable silicon compound (for example, alkoxysilane or a derivative thereof) as a raw material, and carrying out a hydrolysis and condensation reaction in water or in a mixed solvent of water and an organic solvent, colloidal silica can be obtained. The resulting colloidal silica may be used as it is for mixing with a solution containing a cationic silane coupling agent, or may be diluted with a dispersion medium.

As a dispersion medium for the silica dispersion, water or a mixed solvent of water and organic solvents are used. Organic solvents include hydrophilic organic solvents, such as alcohols such as methanol, ethanol, isopropanol, n-butanol, t-butanol, pentanol, ethylene glycol, propylene glycol, and 1,4-butanediol, and ketones such as acetone and methyl ethyl ketone. These organic solvents may be used alone, or in a combination of two or more. A mixing ratio of water and organic solvent is not particularly limited and can be arbitrarily adjusted.

Silica contained in the silica dispersion is usually present in a form of secondary particles that are an aggregate of primary particles. A lower limit of the average particle size of the secondary particles of silica (average secondary particle size) is not particularly limited, and is preferably 10 nm or more, more preferably nm or more, and still more preferably 20 nm or more. An upper limit of the average secondary particle size is preferably 300 nm or less, more preferably 100 nm or less, and still more preferably 60 nm or less. In other words, the average secondary particle size of silica is 10 nm or more and 300 nm or less, more preferably 15 nm or more and 100 nm or less, and still more preferably 20 nm or more and 60 nm or less. If the average secondary particle size is 10 nm or more, dispersibility is sufficiently ensured even at high silica concentrations, and if the average secondary particle size is 300 nm or less, on the other hand, generation of coarse particles can be prevented. Here, as the value of the average secondary particle size, a value measured as a volume average particle size by dynamic light scattering can be adopted.

A lower limit of the average primary particle size of silica contained in the silica dispersion is preferably nm or more, more preferably 7 nm or more, and still more preferably 10 nm or more. Moreover, an upper limit of the average primary particle size of silica is preferably 100 nm or less, more preferably 50 nm or less, and still more preferably 30 nm or less. In other words, the average primary particle size of silica is preferably 5 nm or more and 100 nm or less, more preferably 7 nm or more and 50 nm or less, and still more preferably 10 nm or more and nm or less. The average primary particle size of silica can be calculated by using the formula of $SA=4\pi R^2$ (R is the radius) based on the specific surface area (SA) of silica, assuming that a particle shape of the silica is spherical. A degree of aggregation (average secondary particle size/average primary particle size) calculated from these values is also not particular limited, and is preferably 1.0 or more and 5.0 or less.

The specific surface area of silica contained in the silica dispersion is not particularly limited and can be appropriately selected according to use form of the cationically modified silica. The specific surface area is preferably 10 $m^2/g$ or more and 600 $m^2/g$ or less, more preferably 15 $m^2/g$ or more and 300 $m^2/g$ or less, and still more preferably 20 $m^2/g$ or more and 200 $m^2/g$ or less. As the value of the specific surface area, a value calculated by a nitrogen adsorption method (BET method) can be adopted.

A lower limit of the concentration (content) of silica in the silica dispersion is not particularly limited, and from the viewpoint of productivity, it is preferably 5% by mass or more, more preferably 8% by mass or more, and still more preferably 10% by mass or more. Further, an upper limit of the concentration (content) of silica in the silica dispersion is preferably 40% by mass or less, more preferably 35% by mass or less, and still more preferably 30% by mass or less. In other words, the concentration (content) of silica in the silica dispersion is preferably 5% by mass or more and 40% by mass or less, more preferably 8% by mass or more and 35% by mass or less, and still more preferably 10% by mass or more and 30% by mass or less.

A pH of the silica dispersion is not particularly limited, and is preferably 5.0 or more and 11.0 or less, more preferably 6.0 or more and 10.5 or less, and still more preferably 7.0 or more and 10.0 or less.

Moreover, the silica dispersion prepared above may be further subjected to various treatment steps if necessary. Such a treatment step that is, for example, a step of reducing a viscosity of the silica dispersion, is exemplified. The step of reducing the viscosity of the silica dispersion includes, for example, a step of adding an alkali solution (an aqueous solution of various bases such as ammonia water) or an organic solvent to the silica dispersion. In this case, the amount of alkali solution or organic solvent to be added is not particularly limited and it may be appropriately adjusted in consideration of the viscosity of the silica dispersion obtained after addition. This step of reducing the viscosity of the silica dispersion has an advantage of improving initial dispersibility of the cationic silane coupling agent in the silica dispersion and capable of inhibiting aggregation between the silica particles.

[Silane Coupling Agent Having Cationic Group]

As described above, in order for silica (colloidal silica) to be cationically modified, a dispersion containing silica and a solution containing a silane coupling agent having a cationic group (for example, amino group or quaternary ammonium group) may be mixed and reacted at a predetermined temperature for a predetermined time. Hereinafter, the silane coupling agent having a cationic group is simply referred to as "silane coupling agent" as well and the solution containing the silane coupling agent having a cationic group is simply referred to as "silane coupling agent solution" as well.

Examples of the silane coupling agent used include amino group-containing silanes, such as 3-aminopropyltrimethoxysilane, 3-aminopropyltriethoxysilane, 3-aminopropyltris(2-propoxy)silane, 3-aminopropyldimethoxymethylsilane, 3-aminopropyldimethylmethoxysilane, 3-aminopropylmethyldiethoxysilane, 3-aminopropylethyldimethoxysilane, 3-aminopropyldimethylethoxysilane, 3-(2-aminoethylamino)propyltrimethoxysilane, 3-(2-aminoethylamino)propyltriethoxysilane, 3-(2-aminoethylamino)propyldimethoxymethylsilane, 3-aminopropyldimethoxyethylsilane, trimethoxy[3-(methylamino)propyl]silane, trimethoxy[3-(phenylamino)propyl]silane, [3-(N,N-dimethylamino)propyl]trimethoxysilane, N-phenyl-3-aminopropyltrimethoxysilane, N-(2-aminoethyl)-3-aminopropylmethyldiethoxysilane, N-(2-aminoethyl)-3-aminopropyltrimethoxysilane, N-(2-aminoethyl)-3-aminopropyltriethoxysilane, N-(2-aminoethyl)-3-aminopropyltriisopropoxysilane, N-(2-aminoethyl)-3-aminoisobutyldimethylmethoxysilane, N-(2-aminoethyl)-3-aminoisobutylmethyldimethoxysilane, N-(2-aminoethyl)-11-aminoundecyltrimethoxysilane, N-2-(2-aminoethyl)aminoethyl-3-aminopropyltrimethoxysilane, [3-(6-aminohexylamino)propyl]trimethoxysilane, N-methyl-3-(triethoxysilyl)propan-1-amine, N-[3-(trimethoxysilyl)propyl]butan-1-amine, (aminoethylaminoethyl)phenyltriethoxysilane, methylbenzylaminoethylaminopropyltrimethoxysilane, benzylaminoethylaminopropyltriethoxysilane, 3-ureidopropyltrimethoxysilane, 3-ureidopropyltriethoxysilane, (aminoethylaminoethyl)phenethyltrimethoxysilane, (aminoethylaminomethyl)phenethyltrimethoxysilane, N-[2-[3-(trimethoxysilyl)propylamino]ethyl]ethylenediamine, trimethoxy[2-(2-aminoethyl)-3-aminopropyl]silane, diaminomethylmethyldiethoxysilane, methylaminomethylmethyldiethoxysilane, p-aminophenyltrimethoxysilane, N-methylaminopropyltriethoxysilane, N-methylaminopropylmethyldiethoxysilane, N-phenylaminomethyltrimethoxysilane, N-phenylaminomethyldimethoxymethylsilane, (phenylaminomethyl)trimethoxysilane, (phenylaminomethyl)methyldiethoxysilane, acetamidopropyltrimethoxysilane, N-phenyl-3-aminopropyltrimethoxysilane, N-benzyl-3-aminopropyltrimethoxysilane, N-vinylbenzyl-3-aminopropyltriethoxysilane, N-cyclohexylaminomethyltriethoxysilane, N-cyclohexylaminomethyldiethoxymethylsilane, (2-aminoethyl)aminomethyltrimethoxysilane, (aminomethyl)dimethoxymethylsilane, (aminomethyl)trimethoxysilane, bis(3-trimethoxysilylpropyl)amine, N,N'-bis[3-(trimethoxysilyl)propyl]ethylenediamine; quaternary ammonium group-containing silanes, such as octadecyldimethyl-(γ-trimethoxysilylpropyl)-ammonium chloride, N-trimethoxysilylpropyl-N,N,N-trimethylammonium chloride; etc.

These silane coupling agents may be used alone or in combination of two or more. Moreover, silane coupling agents that are commercially available products or synthetic products, may also be used.

Among the silane coupling agents above, in terms of high water solubility and desired uniform modification treatment on a surface, it is preferred that the silane coupling agent includes at least one selected from the group consisting of 3-aminopropyltrimethoxysilane, 3-aminopropyltriethoxysilane, 3-aminopropyldimethoxymethylsilane, 3-(2-aminoethylamino)propyltrimethoxysilane, 3-(2-aminoethylamino)propyltriethoxysilane, 3-(2-aminoethylamino)propyldimethoxymethylsilane, 3-aminopropyldimethoxyethylsilane, trimethoxy[3-(methylamino)propyl]silane, trimethoxy[3-(phenylamino)propyl]silane, [3-(N,N-dimethylamino)propyl]trimethoxysilane, [3-(6-aminohexylamino)propyl]trimethoxysilane, N-methyl-3-(triethoxysilyl)propan-1-amine, N-[3-(trimethoxysilyl)propyl]butan-1-amine, and bis[(3-trimethoxysilyl)propyl]amine. The silane coupling agent is more preferably at least one selected from the group consisting of 3-aminopropyltrimethoxysilane, 3-aminopropyltriethoxysilane, 3-(2-aminoethylamino)propyldimethoxymethylsilane, 3-aminopropyldimethoxyethylsilane, trimethoxy[3-(methylamino)propyl]silane, trimethoxy[3-(phenylamino)propyl]silane, [3-(N,N-dimethylamino)propyl]trimethoxysilane, [3-(6-aminohexylamino)propyl]trimethoxysilane, N-methyl-3-(triethoxysilyl)propan-1-amine, N-[3-(trimethoxysilyl)propyl]butan-1-amine, and bis[(3-trimethoxysilyl)propyl]amine.

A silane coupling agent solution can be obtained by mixing and stirring a solvent and the silane coupling agent. In this case, the solvent used for the silane coupling agent solution is not particularly limited as long as it can dissolve the silane coupling agent. Examples of the solvents include the water and organic solvents as exemplified as the dispersion media in the aforementioned section [Dispersion containing silica], etc.

In the production method according to the present invention, a concentration (content) of the silane coupling agent in the silane coupling agent solution is 0.03% by mass or more and less than 1% by mass. When the concentration (content) is less than 0.03% by mass, the effect of surface modification cannot be sufficiently obtained. Moreover, when the concentration (content) is 1% by mass or more, coarse particles increase and the productivity of cationically modified silica decreases. A lower limit of the concentration (content) of silane coupling agent in the silane coupling agent solution is preferably 0.04% by mass or more, and more preferably 0.05% by mass or more. Further, an upper limit of the concentration (content) of silane coupling agent in the silane coupling agent solution is 0.8% by mass or less, more preferably 0.5% by mass or less, still more preferably 0.3% by mass or less, and particularly preferably 0.15% by mass or less. In other words, the concentration (content) of silane coupling agent in the silane coupling agent solution is preferably 0.04% by mass or more and 0.8% by mass or less, more preferably 0.05% by mass or more and 0.5% by mass or less, still more preferably 0.05% by mass or more and 0.3% by mass or less, and particularly preferably 0.05% by mass or more and 0.15% by mass or less.

[Mixing of Dispersion Containing Silica and Silane Coupling Agent Solution]

The cationically modified silica according to the present embodiment is obtained by mixing the aforementioned dispersion containing silica and the solution containing the silane coupling agent having a cationic group. Specifically, the mixing allows the silica and the silane coupling agent having a cationic group to react with each other, introducing cationic groups as modified groups to the surface of the silica particles to produce cationically modified silica, and then to obtain a dispersion containing the cationically modified silica.

In the production method according to the present invention, the method of mixing the silica dispersion and the silane coupling agent solution is not particularly limited. For example, to the silane dispersion may be added the silane coupling agent solution, or to the silane coupling agent solution may be added the silica dispersion. Moreover, the silica dispersion and the silane coupling agent solution may be added simultaneously. The method of mixing is preferably a method for adding a solution containing the silane coupling agent to the silica dispersion from the viewpoint of further inhibiting generation of coarse particles. In this case, the silane coupling agent solution may be added in one portion, in divided portions, or continuously. In the case of continuous addition, the addition rate can be appropriately adjusted according to concentrations of the silica dispersion, the silane coupling agent solvent, etc., and, for example, when the total amount added is about 10 mL, the rate is 1 mL/min or more and 10 mL/min or less.

The mixed mass ratio of the silica to the silane coupling agent having a cationic group (silica/silane coupling agent a having cationic group) is appropriately selected according to the amount of cationic groups introduced, etc., and it is preferably 100/0.01 to 100/1 and more preferably 100/0.05 to 100/0.8. The mixed mass ratio in such a range can further inhibit the generation of coarse particles.

A temperature of the silica dispersion and silane coupling agent solution upon mixing is not particularly limited, but it is preferably in the range from normal temperature to a boiling point of the solvent (dispersion medium). In the present embodiment, since the reaction between silica and silane coupling agent can proceed even at about normal temperature, it is preferable to proceed the reaction at a temperature in the vicinity of normal temperature (for example, 20° C. or more and 35° C. or less). Even under the conditions of vicinity of normal temperature (for example, 20° C. or more and 35° C. or less), there is an advantage of reacting almost all of the silane coupling agent added with silica and leaving almost no unreacted silane coupling agent by the extremely simple operation of stirring the reaction system for several hours. In other words, the production method according to one embodiment preferably does not include the step of heating the reaction systems of the silica dispersion and the silane coupling agent solution.

A reaction time of the silica and the silane coupling agent (mixing time of silica dispersion and silane coupling agent solution) is not particularly limited, but is preferably 10 minutes or more and 10 hours or less and more preferably 30 minutes or more and 5 hours or less. From the viewpoint of allowing the reaction to proceed efficiently, the reaction is preferably carried out while stirring the reaction system. The stirring means or stirring conditions to be used in this step are not particularly limited and conventionally and publicly known knowledge thereof may be appropriately referred to. One example thereof includes that from the viewpoint of uniformly dispersing the components, a stirring speed is usually 20 rpm (0.33 $s^{-1}$) or more and 800 rpm (13.3 $s^{-1}$) or less, and preferably 50 rpm (0.83 $s^{-1}$) or more and 700 rpm (11.7 $s^{-1}$) or less.

A pressure of the reaction system as well may be under normal pressure (under atmospheric pressure), under pressurized condition, or under depressurized condition, and is not limited thereto. Since the reaction according to the present invention can proceed under normal pressure (under atmospheric pressure), the reaction is preferably carried out under normal pressure (under atmospheric pressure).

If the cationically modified silica obtained according to the aforementioned method contain a dispersion medium other than water, the dispersion medium other than water may be replaced with water as necessary in order to enhance long-term storage stability of the cationically modified silica. The method for replacing the dispersion medium other than water with water is not particularly limited, and, for example, water may be constantly added dropwise while heating the cationically modified silica. Moreover, a method for separating the cationically modified silica from the dispersion medium other than water by precipitation/separation, centrifugal separation, etc., followed by redispersing the silica in water, is also included.

A lower limit of a zeta potential of the cationically modified silica obtained is preferably 6 mV or more, more preferably 8 mV or more, and still more preferably 10 mV or more. Moreover, an upper limit of the zeta potential of the cationically modified silica obtained is preferably 70 mV or less, and more preferably 60 mV or less, and still more preferably 50 mV or less. In other words, the zeta potential of the cationically modified silica obtained is preferably 6 mV or more and 70 mV or less, more preferably 8 mV or more and 60 mV or less, and still more preferably 10 mV or more and 50 mV or less. As the zeta potential of cationically modified silica used herein, a value measured by the method described in the Examples can be adopted. The zeta potential of cationically modified silica can be adjusted by the amount of cationic groups that the cationically modified silica have.

[Number of Coarse Particles]

According to the production method of the present invention, the generation of coarse particles after addition of silane coupling agent having a cationic group can be inhibited. Specifically, as measured by the measurement method below, the number per unit volume (1 mL) of the coarse particles having a particle size of more than 0.7 μm, which are present in the cationically modified silica aqueous dispersion, is preferably 2,000,000 particles/mL or less, more preferably 1,000,000 particles/mL or less, still more preferably 500,000 particles/mL or less, even still more preferably 100,000 particles/mL or less, particularly preferably 50,000 particles/mL or less, particularly preferably 10,000 particles/mL or less, particularly more preferably 8,000 particles/mL or less, and most preferably 5,000 particles/mL or less.

(Measurement Method of Number of Coarse Particles)

A cationically modified silica aqueous dispersion is prepared by dispersing the cationically modified silica in water at a concentration of 0.27% by mass and adjusting a pH of the dispersion to 4.0, and then, the number per unit volume (1 mL) of coarse particles having a particle size of more than 0.7 μm which are present in the cationically modified silica aqueous dispersion is measured by using a liquid particle counter. It is noted that the details of the method for measuring the number of coarse particles is as described in Examples.

[Other Steps]

The method for producing the polishing composition according to the present invention may further include other steps to the extent that they do not hinder the effects of the present invention. Examples of such other steps include: a step of filtering the dispersion containing the cationically modified silica, a step of mixing the dispersion containing the cationically modified silica and other additives (preferably a pH adjusting agent), a step of mixing the other additives followed by further filtering the dispersion containing cationically modified silica, etc. These steps are described below.

<Step of Filtering Dispersion Containing Cationically Modified Silica (First Stage of Filtration)>

In this step, the dispersion containing the cationically modified silica obtained above is filtered. By carrying out this step, the number of coarse particles in the dispersion can be further reduced.

In the production method according to the present invention, the filtration step may include one stage alone, or may include multiple stages of two or more stages. The technical details described in this section are applied to the filtration in the case of the filtration step of one stage alone, and to the first stage of filtration in the case of the filtration step including multiple stages. The technical details of the second and subsequent stages of filtration in the case of the filtration step including multiple stages will be described below.

A media shape of filter used in this step is not particularly limited, and filters having various structures, shapes, and functions can be appropriately adopted. As a specific example, a pleated type, depth type, depth-pleated type, membrane type, or an adsorption type filter with excellent filterability are preferred. The structure of filter is not particularly limited, and may be a bag type or a hollow cylindrical cartridge type. The cartridge type filter may be a gasket type or an O-ring type. Filtration conditions (for example, filtration differential pressure, filtration rate) may be appropriately set in consideration of target quality, production efficiency, etc., based on the common general technical knowledge in the art.

An aperture size (pore size) of the filter used in this step is preferably 0.05 μm or more, more preferably 0.1 μm or more, and still more preferably 0.2 μm or more from the viewpoint of improving a yield. Moreover, from the viewpoint of enhancing an effect of removing foreign substances and aggregates, the aperture size (pore size) of the filter used in this step is preferably 100 μm or less, more preferably 30 μm or less, and still more preferably 20 μm or less.

In other words, the aperture size (pore size) of the filter used in this step is preferably 0.05 μm or more and 100 μm or less, more preferably 0.1 μm or more and 30 μm or less, and still more preferably 0.2 μm or more and 20 μm or less.

A material of the filter used in this step is not particularly limited, and examples thereof include cellulose, nylon, polysulfone, polyethersulfone, polypropylene, polytetrafluoroethylene (PTFE), polycarbonate, glass, etc.

A method of filtration is also not particularly limited, and for example, in addition to spontaneous filtration at normal pressure, known filtration methods such as suction filtration, pressure filtration, and centrifugal filtration can be appropriately employed.

Filters used in this step may be commercially available. Examples of commercially available filters include a Nuclepore™ membrane filter (manufactured by Whatman plc), a HC series filter equipped with a polypropylene nonwoven fabric as a filter media, a BO series filter, a SLF series filter, a SRL series filter, and a MPX series filter, manufactured By ROKI TECHNO CO., LTD., etc.

<Step of Mixing Other Additives>

In this step, the dispersion containing the cationically modified silica obtained above is mixed with other additives. This step can be carried out either before or after the step of filtering the dispersion containing the cationically modified silica above, however, from the viewpoint of minimizing the introduction of foreign substances into the subsequent step, this step is preferably carried out after the step of filtering the dispersion containing the cationically modified silica above.

Examples of other additives include additives that can be components of the polishing composition, such as a pH adjusting agent, a dispersion medium, a preservative, a rust inhibitor, an antioxidant, a stabilizer, and a pH buffer. Here, the pH adjusting agent is described.

(pH Adjusting Agent)

The pH adjusting agent plays a roll to adjust a pH of the polishing composition according to the present invention to a desired value.

The pH adjusting agent is not particularly limited, and known pH adjusting agents used in the art of polishing compositions, can be used. Among them, known acids, bases, salts, amines, chelating agents, or the like are preferably used. Examples of the pH adjusting agent include carboxylic acids such as formic acid, acetic acid, propionic acid, butyric acid, valeric acid, caproic acid, enanthic acid, caprylic acid, perargonic acid, capric acid, lauric acid, myristic acid, palmitic acid, margaric acid, stearic acid, oleic acid, linoleic acid, linolenic acid, arachidonic acid, docosahexaenoic acid, eicosapentaenoic acid, lactic acid, malic acid, citric acid, benzoic acid, phthalic acid, isophthalic acid, terephthalic acid, salicylic acid, gallic acid, mellitic acid, cinnamic acid, oxalic acid, malonic acid, succinic acid, glutaric acid, adipic acid, fumaric acid, maleic acid, aconitic acid, amino acid, anthranilic acid, and nitrocarboxylic acid; sulfonic acids such as methanesulfonic acid, ethanesulfonic acid, benzenesulfonic acid, p-toluenesulfonic acid, 10-camphorsulfonic acid, isethionic acid, and taurine; inorganic acids such as carbonic acid, hydrochloric acid, nitric acid, phosphoric acid, hypophosphorous acid, phosphorous acid, phosphonic acid, sulfuric acid, boric acid, hydrofluoric acid, orthophosphoric acid, pyrophosphoric acid, polyphosphoric acid, metaphosphoric acid, hexametaphosphoric acid; alkali metal hydroxides such as potassium hydroxide (KOH); hydroxides of Group 2 elements; ammonia; organic bases such as quaternary ammonium hydroxide; amines such as aliphatic amines and aromatic amines; chelating agents, such as N-methyl-D-glucamine, D-glucamine, N-ethyl-D-glucamine, N-propyl-D-glucamine, N-propyl-D-glucamine, N-octyl-D-glucamine, N-acetyl D-glucosamine, tris(hydroxymethyl)aminomethane, bis(2-hydroxyethyl)aminotris(hydroxymethyl)methane, iminodiacetic acid, N-(2-acetamido)iminodiacetic acid, hydroxyethyliminodiacetic acid, N,N-di(2-hydroxyethyl)glycine, N-[tris(hydroxymethyl)methyl]glycine, nitrilotriacetic acid, diethylenetriaminepentaacetic acid, ethylenediaminetetraacetic acid, N,N,N-trimethylenephosphonic acid, ethylenediamine-N,N,N',N'-tetramethylenesulfonic acid, trans-cyclohexanediaminetetraacetic acid, 1,2-diaminopropanetetraacetic acid, glycol ether diamine tetraacetic acid, ethylenediamine orthohydroxyphenylacetic acid, ethylenediamine di-succinic acid (SS form), N-(2-carboxylatoethyl)-L-aspartic acid, (3-alanine diacetic acid, phosphonobutane tricarboxylic acid (2-phosphonobutane-1,2,4-tricarboxylic acid), hydroxyethylidene diphosphonic acid (HEDP) (1-hydroxyethylidene-1,1-diphosphonic acid), nitrilotrismethylenephosphonic acid, N,N'-bis(2-hydroxybenzyl)ethylenediamine-N,N'-diacetic acid, 1,2-dihydroxybenzene-4,6-disulfonic acid, polyamines, polyphosphonic acid, polyaminocarboxylic acid, and polyaminophosphonic acid, or salts thereof. These pH adjusting agents may be used alone or in combination of two or more. Among these pH adjusting agents, from the viewpoint of inhibiting a removal rate of silicon nitride and/or a TEOS type silicon oxide film, strong acids having relatively bulky skeletons such as 10-camphorsulfonic acid, p-toluenesulfonic acid, and isethionic acid are preferably used.

An added amount of pH adjusting agent may be appropriately selected so as to achieve a desired pH value of the polishing composition.

In addition to the role of adjusting a pH of the polishing composition, the pH adjusting agent can also be used as a roll to adjust a pH of the dispersion containing the cationically modified silica to a pH for storage thereof. In other words, in addition to this step, a step of storing the dispersion containing the cationically modified silica with a pH adjusting agent may be included. In this storing step, from the viewpoint of maintaining the dispersibility of the cationically modified silica after filtration, the pH adjusting agent is preferably added so that a pH of the dispersion becomes acidic during storage.

<Step of Further Filtration of Dispersion Containing Cationically Modified Silica (Second and Subsequent Stages of Filtration)

In this step, the dispersion containing the cationically modified silica obtained above is further filtered. The technical details described in this section are applied to the second and subsequent stages of filtration when the filtration step includes multiple stages (two or more stages).

The media shape, structure and material of the filter used in this step, the filtration conditions, the filtration method, etc., can be the same as those described in the section above, <Step of filtering dispersion containing cationically modified silica (first stage of filtration)>.

However, as the media shapes of the filter, a pleated type and a depth type, and a depth-pleated type are industrially preferred in terms of production efficiency. Further, from the viewpoint of improvement on both yield and removal effect of foreign substances and aggregates, the aforementioned filters of pleated type and depth type, and depth-pleated type are preferably used in the filtration step including multiple stages.

In such a case, the aperture size (pore size) of the filter is preferably the same or gradually decreases from a former stage to the latter stage in the multiple stages of the filtration step.

From the viewpoint of improvement on yield, the aperture size (pore size) of the filter used in this step is preferably 0.05 μm or more, more preferably 0.1 μm or more, and still more preferably 0.15 μm or more. Moreover, from the viewpoint of enhancing the removal effect of foreign substances and aggregates, the aperture size (pore size) of the filter used in this step is preferably 10 μm or less, more preferably 5 μm or less, still more preferably 1 μm or less, even still more preferably 0.7 μm or less, and particularly preferably 0.4 μm or less. In other words, the aperture size (pore size) of the filter used in this step is preferably 0.05 μm or more and 10 μm or less, more preferably 0.1 μm or more and 5 μm or less, still more preferably 0.15 μm or more and 1 μm or less, even still more preferably 0.15 μm or more and 0.7 μm or less, and particularly preferably 0.15 μm or more and 0.4 μm or less.

In this step as well, commercially available filters can be used. Examples of the commercially available filters used in this step include Ultipleat (registered trademark) P-Nylon 66 and Ultipore (registered trademark) N66, manufactured by Nippon Pole Co., Ltd., etc.

[Polishing Composition]

The polishing composition obtained by the aforementioned production method has the reduced number of coarse particles. More specifically, according to one preferred embodiment of the present invention, a polishing composition containing the cationically modified silica having cationic groups and a dispersion medium, wherein the number of coarse particles having a particle size of more than 0.7 μm of the cationically modified silica is 500,000 particles/mL or less, and wherein the particle size is measured by the following measurement method, is provided. The number of coarse particles in the polishing composition is preferably 100,000 particles/mL or less, more preferably 10,000 particles/mL or less, and still more preferably 5,000 particles/mL or less.

(Measurement Method of Coarse Particles)

The cationically modified silica is dispersed in water at a concentration of 0.27% by mass and a pH is adjusted to 4.0 to prepare a cationically modified silica aqueous dispersion, and then the number per unit volume of the coarse particles having a particle size more than 0.7 μm which are present in the cationically modified silica aqueous dispersion is measured by using a liquid particle counter.

The dispersion medium contained in the polishing composition includes the same dispersion media as listed in the section [Dispersion containing silica].

The cationically modified silica in the polishing composition of the present embodiment functions as abrasive grains. A lower limit of the content of the cationically modified silica in the polishing composition is preferably 0.1% by mass or more, more preferably 0.2% by mass or more, and still more preferably 0.5% by mass or more, relative to the total mass of the polishing composition. Moreover, an upper limit of the content of the cationically modified silica in the polishing composition is preferably 20% by mass or less, more preferably 10% by mass or less, and still more preferably 5% by mass or less, relative to the total mass of the polishing composition. In other words, the content of the cationically modified silica is preferably 0.1% by mass or more and 20% by mass or less, more preferably 0.2% by mass or more and 10% by mass or less, and still more preferably 0.5% by mass or more and 5% by mass or less, relative to the total mass of the polishing composition.

The polishing composition according to the present embodiment may further contain known additives that can be used in polishing compositions, such as pH adjusting agents, complexing agents, preservatives, antifungal agents, etc., as necessary to the extent that the effects of the invention are not hindered.

The polishing composition according to the present embodiment is preferably used for polishing, for example, polysilicon, silicon nitride, silicon carbide (SiCN), silicon oxide, metals, SiGe, and the like.

Examples of polishing objects including silicon oxide include, for example, a TEOS-type silicon oxide surface produced by using tetraethyl orthosilicate as a precursor (hereinafter simply referred to as "TEOS"), a HDP (High Density Plasma) film, a USG (Undoped Silicate Glass) film, a PSG (Phosphorus Silicate Glass) film, a BPSG (Boron-Phospho Silicate Glass) film, an RTO (Rapid Thermal Oxidation) film, etc.

The above metals include, for example, tungsten, copper, aluminum, cobalt, hafnium, nickel, gold, silver, platinum, palladium, rhodium, ruthenium, iridium, osmium, etc.

Although embodiments of the present invention have been described in detail, it is clear that they are illustrative and exemplary, not limiting, and that the scope of the present invention should be interpreted by the appended claims.

The present invention encompasses the following aspects and embodiments.

1. The method for producing a polishing composition, comprising mixing a dispersion containing silica and a solution containing a silane coupling agent having a cationic group at a concentration of 0.03% by mass or more and less than 1% by mass to obtain a dispersion containing cationically modified silica.
2. The method according to the above 1., wherein a mixed mass ratio of the silica to the silane coupling agent having a cationic group (silica/silane coupling agent having a cationic group) is in a range of 100/0.05 to 100/0.8.
3. The method according to the above 1. or 2., wherein a concentration of the silane coupling agent having a cationic group in the solution is 0.05% by mass or more and 0.6% by mass or less.
4. The method according to any one of the above 1., to the above 3., the mixing comprises adding the solution containing the silane coupling agent having a cationic group to the dispersion containing the silica.
5. The method according to any one of the above 1. to the above 4., wherein the silica is colloidal silica.
6. The method according to any one of the above 1. to the above 5., wherein the silane coupling agent having a cationic group is at least one selected from the group consisting of 3-aminopropyltrimethoxysilane, 3-aminopropyltriethoxysilane, 3-aminopropyldimethoxymethylsilane, 3-(2-aminoethylamino)propyltrimethoxysilane, 3-(2-aminoethylamino)propyltriethoxysilane, 3-(2-aminoethylamino)propyldimethoxymethylsilane, 3-aminopropyldimethoxymethylsilane, trimethoxy[3-(methylamino)propyl]silane, trimethoxy[3-(phenylamino)propyl]silane, [3-(N,N-dimethylamino)propyl]trimethoxysilane, [3-(6-aminohexylamino)propyl]trimethoxysilane, N-methyl-3-(triethoxysilyl)propan-1-amine, N-[3-(trimethoxysilyl)propyl]butan-1-amine, and bis[(3-trimethoxysilyl)propyl]amine.
7. The method according to any one of the above 1. to the above 6., further comprising filtering the dispersion containing the cationically modified silica.
8. The method according to any one of the above 1. to the above 7., further comprising mixing the dispersion containing the cationically modified silica and a pH adjusting agent.
9. A polishing composition comprising:
   cationically modified silica having cationic groups and a dispersion medium, wherein the number of coarse particles having a particle size of more than 0.7 μm of the cationically modified silica is 500,000 particles/mL or less, and wherein the particle size is measured by the following measurement method:

(Measurement Method)

The cationically modified silica is dispersed in water at a concentration of 0.27% by mass and a pH is adjusted of 4.0 to prepare a cationically modified silica aqueous dispersion, and then, the number per unit volume (1 mL) of the coarse particles having a particle size more than 0.7 μm which are present in the cationically modified silica aqueous dispersion is measured by using a liquid particle counter.

EXAMPLES

The present invention is described in more detail with reference to the following Examples and Comparative Examples. However, the technical scope of the present invention is not limited only to the following Examples. Herein, "%" and "part" refer to "% by mass" and "part by mass," respectively, unless otherwise specified.

[Measurement Methods of Various Physical Properties]

In the present Examples, various physical properties were measured by the following methods.

<Measurement of Particle Size>

A value of average primary particle size of silica used as a raw material was determined based on a specific surface area (SA) of silica calculated from the BET method, by using the formula $SA=4\pi R^2$ (R is the radius), assuming that the silica is spherical in shape.

<Measurement of pH> pH values of the various aqueous dispersions and aqueous solutions were confirmed with a pH meter (model number: F-71, manufactured by HORIBA, Ltd.)

[Production of Cationically Modified Silica]

Example 1

In a 2 L plastic mug, deionized water and synthetic amorphous silica (colloidal silica, average primary particle size of silica: 24 nm, average secondary particle size of silica: 47 nm, and zeta potential: 5.5 mV) were mixed to obtain an aqueous dispersion with a final concentration of synthetic amorphous silica of 19.88% by mass (pH 7.5).

Separately, 0.771 g of 3-aminopropyltriethoxysilane (APTES) and 231 g of deionized water were mixed to prepare an APTES aqueous solution with a concentration of 0.33% by mass (pH 7.0).

While stirring 1,000 g of aqueous dispersion of silica at 230 rpm, the total amount of the APTES aqueous solution prepared above was added dropwise at a dropping rate of 12 mL/min. Thereafter, stirring was maintained at room temperature (25° C.) for 50 minutes to obtain an aqueous dispersion of cationically modified (amino-modified) silica with amino groups introduced on the surface of the silica.

Examples 2 and 3, Examples 5 to 20, Comparative Examples 1 to 3

Aqueous dispersions of cationically modified silica were each prepared in the same manner as in Example 1, except that the average primary particle size of the synthetic amorphous silica, the concentration of silica in the silica aqueous dispersion, the type and amount of silane coupling agent, and the amount of water used upon the preparation of the silane coupling agent solution were changed as in Table 1 below.

Example 4

In a 2 L plastic mug, 0.771 g of 3-aminopropyltriethoxysilane (APTES) and 771 g of deionized water were mixed to prepare an APTES aqueous solution with a concentration of 0.10% by mass.

Separately, deionized water and synthetic amorphous silica (average primary particle size: 24 nm, average secondary particle size: 47 nm) were mixed to prepare an aqueous dispersion of silica with a final concentration of synthetic amorphous silica of 19.88% by mass (pH 7.46).

While stirring the total amount of APTES aqueous solution prepared above at 230 rpm, 1,000 g of the aqueous dispersion of silica prepared above was added dropwise at a dropping rate of 16 mL/min. Thereafter, stirring was maintained at room temperature (25° C.) for 50 minutes to obtain an aqueous dispersion of cationically modified (amino-modified) silica having amino groups introduced on the surface.

The configurations of the aqueous dispersions of silica and silane coupling agent aqueous solutions used in Examples and Comparative Examples are shown in Table 1 below.

TABLE 1

| | Synthetic amorphous silica aqueous dispersion | | | | Silane coupling agent aqueous solution | | | | |
|---|---|---|---|---|---|---|---|---|---|
| | Silica primary particle size (nm) | Concentration (% by mass) | Amount of silica aqueous dispersion used (g) | pH | Types | Amount of silane coupling agent used (g) | Amount of water used (g) | Concentration (% by mass) | pH |
| Example 1 | 24 | 19.88 | 1000 | 7.5 | 3-Aminopropyltriethoxysilane | 0.771 | 231 | 0.33 | 7.0 |
| Example 2 | 24 | 19.88 | 1000 | 7.5 | 3-Aminopropyltriethoxysilane | 0.771 | 385 | 0.20 | 7.0 |
| Example 3 | 24 | 19.88 | 1000 | 7.5 | 3-Aminopropyltriethoxysilane | 0.771 | 771 | 0.10 | 7.0 |
| Example 4 | 24 | 19.88 | 1000 | 7.5 | 3-Aminopropyltriethoxysilane | 0.771 | 771 | 0.10 | 7.0 |
| Example 5 | 24 | 10.00 | 1000 | 7.4 | 3-Aminopropyltriethoxysilane | 0.771 | 771 | 0.10 | 7.0 |
| Example 6 | 35 | 19.50 | 1000 | 7.5 | 3-Aminopropyltriethoxysilane | 0.757 | 756 | 0.10 | 7.0 |
| Example 7 | 24 | 19.88 | 1000 | 7.5 | 3-Aminopropyltriethoxysilane | 0.771 | 867 | 0.09 | 7.0 |
| Example 8 | 24 | 19.88 | 1000 | 7.5 | 3-Aminopropyldimethoxymethylsilane | 0.771 | 771 | 0.10 | 7.0 |
| Example 9 | 24 | 19.88 | 1000 | 7.5 | 3-(2-Aminoethylamino)propyltriethoxysilane | 0.771 | 771 | 0.10 | 7.0 |
| Example 10 | 24 | 19.88 | 1000 | 7.5 | Bis[3-(trimethoxysilyl)propyl]amine | 0.771 | 771 | 0.10 | 7.0 |
| Example 11 | 24 | 19.88 | 1000 | 7.5 | 3-(2-Aminoethylamino)propyltrimethoxysilane | 0.771 | 771 | 0.10 | 7.0 |
| Example 12 | 24 | 19.88 | 1000 | 7.5 | 3-(2-Aminoethylamino)propyldimethoxymethylsilane | 0.771 | 771 | 0.10 | 7.0 |
| Example 13 | 24 | 19.88 | 1000 | 7.5 | [3-(6-Aminohexylamino)propyl]trimethoxysilane | 0.771 | 771 | 0.10 | 7.0 |
| Example 14 | 24 | 19.88 | 1000 | 7.5 | Trimethoxy[3-(phenylamino)propyl]silane | 0.771 | 771 | 0.10 | 7.0 |
| Example 15 | 24 | 19.88 | 1000 | 7.5 | N-methyl-3-(triethoxysilyl)propan-1-amine | 0.771 | 771 | 0.10 | 7.0 |
| Example 16 | 24 | 19.88 | 1000 | 7.5 | [3-(N,N-dimethylamino)propyl]trimethoxysilane | 0.771 | 771 | 0.10 | 7.0 |
| Example 17 | 24 | 19.88 | 1000 | 7.5 | 3-aminopropyldiethoxymethylsilane | 0.771 | 771 | 0.10 | 7.0 |
| Example 18 | 24 | 19.88 | 1000 | 7.5 | N-[3-(trimethoxysilyl)propyl]butan-1-amine | 0.771 | 771 | 0.10 | 7.0 |
| Example 19 | 24 | 19.88 | 1000 | 7.5 | 3-aminopropyltrimethoxysilane | 0.771 | 771 | 0.10 | 7.0 |
| Example 20 | 24 | 19.88 | 1000 | 7.5 | Trimethoxy[3-(methylamino)propyl]silane | 0.771 | 771 | 0.10 | 7.0 |
| Comparative Example 1 | 24 | 19.88 | 1000 | 7.5 | 3-aminopropyltrimethoxysilane | 0.771 | — | 100 | — |
| Comparative Example 2 | 24 | 19.88 | 1000 | 7.5 | 3-aminopropyltrimethoxysilane | 0.771 | 76 | 1.0 | 7.0 |
| Comparative Example 3 | 24 | 10.00 | 1000 | 7.5 | 3-aminopropyltrimethoxysilane | 0.771 | — | 100 | — |

[Evaluation]

<Measurement of Number of Coarse Particles>

As a sample, the cationically modified silica were dispersed in deionized water so that the concentration of cationically modified silica was 0.27% by mass, and then sulfuric acid was used to adjust a pH of the aqueous dispersion for use to 4.0.

The number per unit volume (1 mL) of the coarse particles more than 0.7 μm which are present in the resulting cationically modified silica aqueous dispersion was determined by using a liquid particle counter (LPC, AccuSizer (registered trademark) FX (manufactured by Nippon Entegris G.K.)). Upon the measurement, an average value of n=3 was obtained, and the decimals were rounded to the nearest whole number.

<Measurement of Zeta Potential>

A zeta potential of the cationically modified silica obtained was measured by using a zeta potential measurement apparatus (product name "ELS-Z") manufactured by Otsuka Electronics Co., Ltd. As a sample, the cationically modified silica were dispersed in deionized water to a concentration of 1.8% by mass, and then sulfuric acid was used to adjust a pH of the aqueous dispersion for use to 3.0.

<Filtration Rate>

The aqueous dispersions of cationically modified silica obtained in the above Examples and Comparative Examples were each subjected to suction filtration by using a Nuclepore™ membrane filter with a pore size of 3.0 μm and a diameter of 47 mm, manufactured by Whatman plc, and the filtration rate (filtration amount per unit time (1 minute)) was measured. It is noted that the filtration rate was an average rate of filtration for 5 minutes.

The results of the above evaluations are shown in Table 2 below. It is noted that the blank columns in Table 2 below indicate that the evaluations have not been conducted.

TABLE 2

| | Coarse particles (>0.7 μm) (particles/mL) | Zeta potential (mV) | Filtration rate (g/min) |
|---|---|---|---|
| Example 1 | 20858 | 24.2 | 950 |
| Example 2 | 18698 | 26.4 | 975 |
| Example 3 | 7131 | 27.2 | 1098.7 |
| Example 4 | 1570407 | 25.0 | |
| Example 5 | 6531 | 27.2 | |
| Example 6 | 12531 | 28.0 | |
| Example 7 | 5092 | 31.0 | |
| Example 8 | 9318 | | |
| Example 9 | 9500 | | |
| Example 10 | 7583 | | |
| Example 11 | 7222 | 30.5 | |
| Example 12 | 7435 | | |
| Example 13 | 8132 | | |
| Example 14 | 8765 | | |

TABLE 2-continued

| | Coarse particles (>0.7 μm) (particles/mL) | Zeta potential (mV) | Filtration rate (g/min) |
|---|---|---|---|
| Example 15 | 8356 | | |
| Example 16 | 8646 | | |
| Example 17 | 8124 | 28.7 | |
| Example 18 | 7323 | | |
| Example 19 | 7213 | | |
| Example 20 | 7493 | 21.0 | |
| Comparative Example 1 | 3020956 | 23.7 | 1.18 (Clogged up) |
| Comparative Example 2 | 5844796 | 26.1 | 0.32 (Clogged up) |
| Comparative Example 3 | 2720956 | 23.6 | |

As clearly shown in Table 2 above, the zeta potential of the cationically modified silica in the aqueous dispersion obtained in each of Examples was higher than that of the synthetic amorphous silica that was the raw material. This indicates that the cationically modified silica in which the cationic groups were bonded to the surface of synthetic amorphous silica were obtained by the production method in Examples.

The cationically modified silica aqueous dispersions in Comparative Examples 1 and 2 clogged up the respective filters during 5-minute filtration pass-through and resulted in the low filtration rate as well. On the other hand, the cationically modified silica aqueous dispersions obtained in Examples were found to have fewer coarse particles and excellent in filterability than the aqueous dispersions of Comparative Examples. Therefore, when the cationically modified silica aqueous dispersions of Examples with excellent filterability is used in the production of polishing compositions, it is possible to use a fine filter, which is advantageous for reducing the number of coarse particles in the polishing compositions.

Example 21, Comparative Example 4

The cationically modified silica aqueous dispersion obtained in Example 7 above was filtered through a filter with a pore size of 10 μm (SLF type (depth type) manufactured by ROKI TECHNO CO., LTD.). The filtered cationically modified silica aqueous dispersion was dispersed in deionized water to a concentration of the cationically modified silica of 5.4% by mass, and then adjusted to a pH of 4.0 by using 10-camphorsulfonic acid. Further, this cationically modified silica aqueous dispersion was then filtered through a filter with a pore size of 0.2 μm (Ultipore (registered trademark) N66 (pleated type), manufactured by Nippon Pole Co., Ltd.), to prepare the polishing composition (slurry) of Example 21.

Moreover, the cationically modified silica aqueous dispersion obtained in Comparative Example 1 above was filtered through a filter with a pore size of a 10 μm (SLF type (depth type), manufactured by ROKI TECHNO CO., LTD.). The filtered cationically modified silica aqueous dispersion was dispersed in deionized water to a concentration of the cationically modified silica of 5.4% by mass, and then adjusted to a pH of 4.0 by using 10-camphorsulfonic acid. Further, the cationically modified silica aqueous dispersion was then filtered through a filter with a pore size of 3.0 μm (SLF type (depth type), manufactured by ROKI TECHNO CO., LTD.), to prepare the polishing composition (slurry) of Comparative Example 4.

The numbers of coarse particles present in the polishing compositions of Example 21 and Comparative Example 4 were measured by LPC in the same manner as in the measurement of coarse particles described above.

TABLE 3

| | Coarse particles (>0.7 μm) (particles/mL) |
|---|---|
| Example 21 | 3846 |
| Comparative Example 4 | 1262791 |

As clearly shown in Table 3 above, the polishing composition of Example 21 prepared by using the cationically modified silica aqueous dispersion in the aqueous dispersion, obtained in Examples resulted in the fewer number of coarse particles than that of Comparative Example 4. Polishing with the polishing composition with fewer coarse particles can inhibit the generation of defects upon polishing.

This application is based on Japanese Patent Application No. 2021-86075 filed on May 21, 2021, and Japanese Patent Application No. 2022-36107 filed on Mar. 9, 2022, the contents of disclosure of which are incorporated herein by reference in their entirety.

The invention claimed is:

1. A method for producing a polishing composition, the method comprising:

mixing a dispersion containing silica and a solution containing a silane coupling agent having a cationic group to obtain a dispersion containing cationically modified silica, wherein the mixing comprises adding the solution containing the silane coupling agent having a cationic group to the dispersion containing the silica to render a mixture, wherein the solution containing the silane coupling agent consists of the silane coupling agent and a solvent that is water or consists of the silane coupling agent and a mixed solvent that is water mixed with at least one organic solvent selected from the group consisting of methanol, ethanol, isopropanol, n-butanol, t-butanol, pentanol, ethylene glycol, propylene glycol, 1,4-butanediol, acetone and methyl ethyl ketone, wherein the silane coupling agent is present in the solution at a concentration of 0.09% by mass or more and 0.70% by mass or less, and wherein an amount of the solution containing the silane coupling agent is selected such that the total amount of the silane coupling agent added corresponds to 0.04% by mass or more and 0.07% by mass or less, based on the total mass of the mixture of the solution containing the silane coupling agent and the dispersion containing silica.

2. The method according to claim 1, wherein a mixed mass ratio of the silica to the silane coupling agent having a cationic group (silica/silane coupling agent having a cationic group) is in a range of 100/0.05 to 100/0.8.

3. The method according to claim 1, wherein a concentration of the silane coupling agent having a cationic group in the solution containing the silane coupling agent is 0.09% by mass or more and 0.6% by mass or less.

4. The method according to claim 1, wherein the silica is colloidal silica.

5. The method according to claim 1, wherein the silane coupling agent having a cationic group is at least one selected from the group consisting of 3-aminopropyltrimethoxysilane, 3-aminopropyltriethoxysilane, 3-aminopropyldimethoxymethylsilane, 3-(2-aminoethylamino) propyltrimethoxysilane, 3-(2-aminoethylamino) propyltriethoxysilane, 3-(2-aminoethylamino) propyldimethoxymethylsilane, 3-aminopropyldimethoxymethylsilane, trimethoxy [3-(methylamino)propyl]silane, trimethoxy [3-(phenylamino)propyl]silane, [3-(N,N-dimethylamino)propyl]trimethoxysilane, [3-(6-aminohexylamino)propyl] trimethoxysilane, N-methyl-3-(triethoxysilyl) propan-1-amine, N-[3-(trimethoxysilyl)propyl]butan-1-amine, and bis [(3-trimethoxysilyl)propyl]amine.

6. The method according to claim 1, further comprising filtering the dispersion containing the cationically modified silica.

7. The method according to claim 1, further comprising mixing the dispersion containing the cationically modified silica and a pH adjusting agent.

8. The method according to claim 1, wherein the cationic group contained in the silane coupling agent is an amino group or a quaternary ammonium group.

9. The method according to claim 1, wherein the silane coupling agent having a cationic group is 3-aminopropyltriethoxysilane.

10. The method according to claim 1, wherein a number of coarse particles having a particle size of more than 0.7 μm of the cationically modified silica contained in the polishing composition is 500,000 particles/mL or less, and wherein the particle size is measured by a measurement method as follows:

the cationically modified silica is dispersed in water at a concentration of 0.27% by mass and a pH is adjusted to 4.0 to prepare a cationically modified silica aqueous dispersion, and then, the number per unit volume (1 mL) of coarse particles having a particle size of more than 0.7 μm which are present in the cationically modified silica aqueous dispersion is measured by using a liquid particle counter.

11. The method according to claim 6, wherein the filtering comprises a first stage of filtration and a second stage of filtration, and wherein a pore size of a filter used in the second stage of filtration is smaller than that of a filter used in the first stage of filtration.

12. The method according to claim 6, wherein the filtering comprises a first stage of filtration and a second stage of filtration, and wherein a pore size of a filter used in the second stage of filtration is 0.05 μm or more and 0.4 μm or less.

13. The method according to claim 1, further comprising preparing the solution by mixing the solvent and the silane coupling agent.

14. The method according to claim 1, wherein the concentration of the silane coupling agent having a cationic group in the solution containing the silane coupling agent is 0.5% by mass or less.

15. The method according to claim 1, wherein a concentration of silica in the dispersion containing the silica is 5% by mass or more and 40% by mass or less.

16. The method according to claim 1, wherein the silane coupling agent solution is added to the dispersion containing the silica continuously or in divided portions.

17. The method according to claim 1, wherein the silane coupling agent solution is added to the dispersion containing the silica in one portion.

* * * * *